ns* PH* * * * * * * * * * * * * * * * * * * * *
US011700198B2

(12) United States Patent
Peng et al.

(10) Patent No.: US 11,700,198 B2
(45) Date of Patent: Jul. 11, 2023

(54) TRANSMISSION CONTROL METHOD, NODE, NETWORK SYSTEM AND STORAGE MEDIUM

(71) Applicant: ZTE CORPORATION, Guangdong (CN)

(72) Inventors: Shaofu Peng, Guangdong (CN); Baoya Zhang, Guangdong (CN); Haihua Tang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 253 days.

(21) Appl. No.: 17/274,912

(22) PCT Filed: Apr. 11, 2019

(86) PCT No.: PCT/CN2019/082206
§ 371 (c)(1),
(2) Date: Mar. 10, 2021

(87) PCT Pub. No.: WO2020/052230
PCT Pub. Date: Mar. 19, 2020

(65) Prior Publication Data
US 2022/0052945 A1 Feb. 17, 2022

(30) Foreign Application Priority Data
Sep. 14, 2018 (CN) .......................... 201811074914.7

(51) Int. Cl.
H04L 45/50 (2022.01)
H04W 28/06 (2009.01)
H04W 40/02 (2009.01)

(52) U.S. Cl.
CPC ........... *H04L 45/50* (2013.01); *H04W 28/065* (2013.01); *H04W 40/02* (2013.01)

(58) Field of Classification Search
CPC . H04L 45/50; H04L 12/4633; H04L 12/4645; H04L 49/3009; H04W 28/065; H04W 40/02
See application file for complete search history.

(56) References Cited

U.S. PATENT DOCUMENTS

2013/0227108 A1    8/2013  Dunbar et al.
2016/0094438 A1*   3/2016  Dutta ...................... H04L 45/50
                                                           370/389
(Continued)

FOREIGN PATENT DOCUMENTS

CN    106550410 A    3/2017
CN    107517488 A    12/2017
(Continued)

OTHER PUBLICATIONS

WIPO, International Search Report dated Jun. 28, 2019.
(Continued)

*Primary Examiner* — Kibrom T Hailu
(74) *Attorney, Agent, or Firm* — Li & Cai Intellectual Property (USA) Office

(57) ABSTRACT

The present disclosure provides a transmission control method, a node, a network system, and a storage medium. The transmission control method includes encapsulating, by a node, overlay service identification information corresponding to a packet in the packet, and transmitting, by the node, the packet to a next hop using an underlay network resource dedicated to a service corresponding to the overlay service identification information.

18 Claims, 11 Drawing Sheets

(56) References Cited

U.S. PATENT DOCUMENTS

| | | | |
|---|---|---|---|
| 2016/0134528 A1* | 5/2016 | Lin | H04L 12/4641 |
| | | | 709/238 |
| 2016/0269198 A1 | 9/2016 | Choi | |
| 2017/0208011 A1* | 7/2017 | Bosch | H04L 47/29 |
| 2018/0191471 A1* | 7/2018 | Elhaddad | H04L 1/24 |
| 2018/0206152 A1 | 7/2018 | Zhang et al. | |
| 2018/0220276 A1 | 8/2018 | Senarath et al. | |
| 2019/0124704 A1 | 4/2019 | Sun et al. | |
| 2020/0014623 A1* | 1/2020 | Wang | H04L 12/4679 |

FOREIGN PATENT DOCUMENTS

| | | |
|---|---|---|
| CN | 108307516 A | 7/2018 |
| EP | 3276892 A1 | 1/2018 |

OTHER PUBLICATIONS

Gateway Function for Network Slicing draft-homma-nfvrg-slice-gafeway-00, HOMMA, Shunsuke, Feb. 2, 2017.
European Patent Office, Extended European Search Report dated Apr. 4, 2022; Corresponding to EP Application No. 19860156.9.

\* cited by examiner

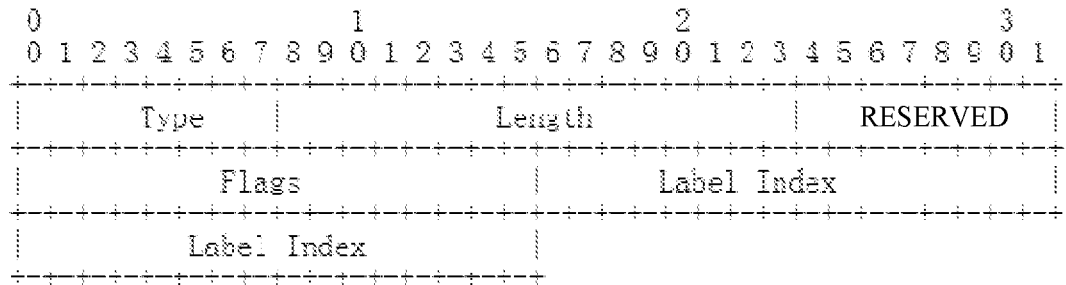
Fig. 3c
401
when a node receives a packet, forward, by the node, the packet using an underlay network resource dedicated to a service corresponding to overlay service identification information carried in the packet
Fig. 4
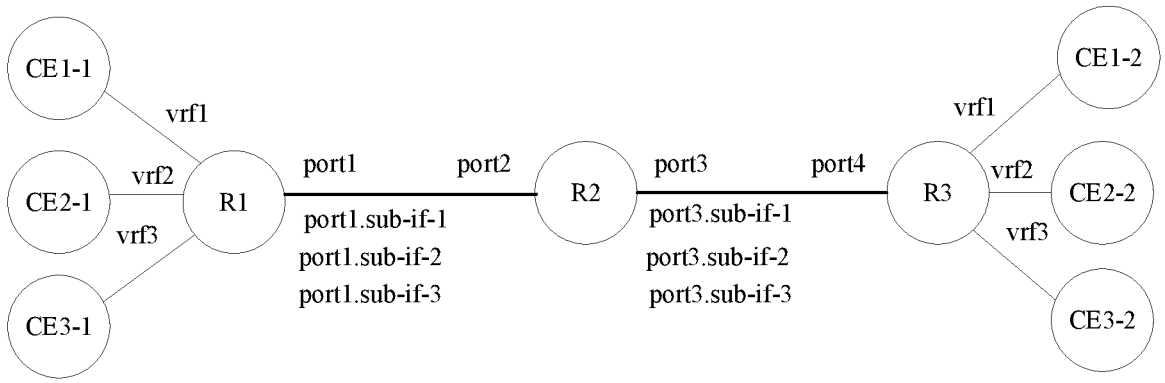
Fig. 5

TRANSMISSION CONTROL METHOD, NODE, NETWORK SYSTEM AND STORAGE MEDIUM

TECHNICAL FIELD

The embodiments of the present disclosure relate to, but are not limited to, a transmission control method, a node, a network system, and a computer-readable storage medium.

BACKGROUND

A core requirement of 5G slices for a carrying network is that different slices need to be allocated with dedicated carrying sub-networks, and the different dedicated sub-networks may be strict hard isolation of resources, or may be soft isolation that may achieve an approximate effect as the hard isolation. Packet networks, which have never been designed to support hard isolation, support statistical multiplexing, and are more economical than private networks or Time Division Multiplexing (TDM) networks. In order to meet the requirement of the 5G slices, it is necessary to slice an underlay network resource of a packet network to meet requirements of different overlay services, such as a Virtual Private Network (VPN) service. At present, various slicing technologies of 5G carrying network are proposed in the art. For example, some of the slicing technologies adopt an Inter Gateway Protocol (IGP) multitopology technology, which partitions the same physical network topology into multiple logical sub-topologies, and assign different overlay services to different logical sub-topologies; and some of the slicing technologies adopt an IGP Flex Algorithm technology, which runs a plurality of IGP algorithms in the same topology to calculate a plurality of forwarding paths, and iterates different overlay services to different forwarding paths. Those technologies are essentially similar to one another, and all require maintenance of a plurality of IGP routing tables in packet network equipment, resulting in high overheads and cost when implemented.

SUMMARY

At least one embodiment of the present disclosure provides a transmission control method, a node, a network system, and a computer-readable storage medium.

At least one embodiment of the present disclosure provides a transmission control method, including encapsulating, by a node, overlay service identification information corresponding to a packet in the packet, and transmitting, by the node, the packet to a next hop using an underlay network resource dedicated to a service corresponding to the overlay service identification information.

An embodiment of the present disclosure provides a transmission control method, including, when a node receives a packet, forwarding, by the node, the packet using an underlay network resource dedicated to a service corresponding to overlay service identification information carried in the packet.

An embodiment of the present disclosure provides a node, including a memory having a program stored thereon, and a processor. When the program is read and executed by the processor, the transmission control method described in any one of embodiments is performed.

At least one embodiment of the present disclosure provides a computer-readable storage medium having one or more programs stored thereon, and the one or more programs are executable by one or more processors to perform the transmission control method described in any one of embodiments.

An embodiment of the present disclosure provides a network system, including an ingress node, at least one intermediate node, and an egress node. The ingress node is configured to encapsulate overlay service identification information corresponding to a packet in the packet, and transmit the packet to a next hop using an underlay network resource dedicated to a service corresponding to the overlay service identification information. The intermediate node is configured to forward, when receiving a packet, the packet using an underlay network resource dedicated to a service corresponding to overlay service identification information carried in the packet. The egress node is configured to forward, when receiving a packet, the packet using an underlay network resource dedicated to a service corresponding to overlay service identification information carried in the packet.

Compared with the prior art, in at least one embodiment of the present disclosure, when a node receives a packet, the node encapsulates overlay service identification information corresponding to the packet in the packet, and transmits the packet to a next hop using an underlay network resource dedicated to a service corresponding to the overlay service identification information, which obviates the need to maintain the complex IGP multitopology or multi-algorithm types for providing slices, thereby reducing the overheads.

The other technical features and advantages of the present disclosure will be illustrated below in the description, and become partially obvious through the description, or be understood by implementing the present disclosure. The objectives and the other advantages of the present disclosure may be realized and attained with the structures particularly pointed out in the description, claims and drawings.

BRIEF DESCRIPTION OF THE DRAWINGS

The accompanying drawings are intended to provide further understanding of the technical solutions of the present disclosure, and are incorporated in and constitute a part of the specification. The drawings, together with the embodiments of the present disclosure, are intended to illustrate the technical solutions of the present disclosure, but the technical solutions of the present disclosure are not limited thereto.

FIGS. 3a to 3c are schematic diagrams illustrating extension of a Multiprotocol Label Switching (MPLS) label protocol and a Segment Routing (SR) protocol;

FIG. 4 is a flowchart illustrating a transmission control method according to an embodiment of the present disclosure;

FIG. 5 is a diagram of a network topology according to Exemplary Embodiments One and Two of the present disclosure;

DETAILED DESCRIPTION

In order to make the objectives, technical solutions and advantages of the present disclosure clearer, the embodiments of the present disclosure are described in detail below with reference to the accompanying drawings. It should be noted that the embodiments and the technical features thereof in the present application may be arbitrarily combined with one another without conflict.

The steps illustrated in the flowcharts of the drawings may be performed in a computer system such as a set of computer-executable instructions. In addition, although a logical order is illustrated in the flowchart, the steps illustrated or described may be performed in an order different from that described herein in some cases.

In the related art, a plurality of IGP routing tables need to be maintained in the packet network equipment, resulting in high overheads and cost of implementation. Through careful consideration of the core requirement of 5G carrying network, it can be found that it is unnecessary to make the IGP operate in such a complicated way, and what is needed is merely mapping overlay services to the dedicated underlay network resources thereof, which may be Layer 3 ports, Layer 2 ports, queues, processors, etc. In a 5G carrying network, one basic requirement is that underlay network resources need to be sliced, that is, some of the underlay network resources need to be configured with dedicated slice identifiers (slice-ids), and another basic requirement is that overlay services are performed within the dedicated slices thereof and are also configured with dedicated slice-ids. Therefore, the slice-id is key information about an association between the overlay services and the underlay network resources. Based on the above, the present disclosure puts forward a concept of "slice label", which associates an overlay service assigned to a specified slice with the underlay network resource, and also enables the carrying network to identify massive services more accurately and guarantees Quality of Service (QoS) based on service classification. An MPLS Label Switched Path (LSP) advertised and created based on a slice label is called an MPLS slice LSP, which performs a function of associating an overlay service of a slice with an underlay network resource dedicated to the slice. A loopback route of a node may be configured to function as a Forward Equivalence Class (FEC) with slicing capability, which is called FEC with slice-capability (hereinafter referred to as slice FEC for short), and an MPLS label with slicing capability is allocated to the slice FEC, and is called label with slice-capability (hereinafter referred to as slice label for short), and other node(s) is (are) notified of a binding relationship between the slice FEC and the slice label. Subsequently, a packet is transmitted based on the slice label and the overlay service identifier.

Figure 1:
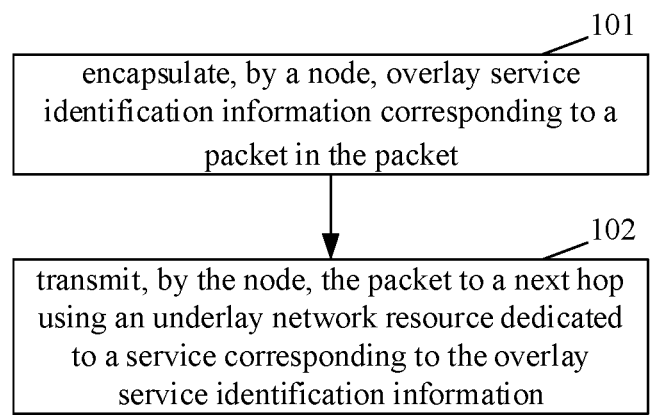
FIG. 1 is a flowchart illustrating a transmission control method according to an embodiment of the present disclosure.

As shown in FIG. 1, an embodiment of the present disclosure provides a transmission control method, including step 101 and step 102.

At step 101, encapsulating, by a node, overlay service identification information corresponding to a packet in the packet.

The packet is generated by the node or received from another node (for example, a packet is received from a customer edge (CE) side).

The overlay service identification information has a mapping relationship with an underlay network resource.

At step 102, transmitting, by the node, the packet to a next hop using an underlay network resource dedicated to a service corresponding to the overlay service identification information.

The packet transmitted in the step 102 is the packet in which the overlay service identification information is encapsulated in the step 101.

Compared with the related art, the method provided by this embodiment obviates the need to run the complex IGP multitopology or multi-algorithm types for providing slices, thereby reducing the overheads. In the related art, all the methods based on the IGP multitopology technology or the IGP Flex Algorithm technology need to allocate different MPLS labels to the same prefix FEC which belongs to different topologies or different Flex algorithms, that is, setting up a plurality of different MPLS LSPs for different slices to reach the same destination (i.e., the same prefix FEC). In contrast, the solution provided by this embodiment only needs to set up a single MPLS LSP with slicing capability for different slices to reach the same destination, thereby greatly saving label resources and reducing maintenance overheads. For example, the method provided by this embodiment is applicable to a scenario where a virtual network of all slices is a homogeneous network.

In one embodiment, the overlay service identification information includes at least one of a slice identifier (slice-id) and traffic engineering constraint indication information (color). The slice-id locks one slice based on broad classification of services and indicates a limitation that only an underlay network resource of a target slice (i.e. the slice indicated by the slice-id) can be accessed; and the color indicates finer flow classification within a slice, which is detailed classification of services under the broad classification, and has the same definition as the color in an SR policy defined in draft-ietf-spring-segment-routing-policy-01, and a value of the color corresponds to a set of Traffic Engineering (TE) constraints (such as bandwidth, latency, and affinity). For example, it is indicated that an overlay service has no TE requirement when the color is 0, and that an overlay service has a TE requirement when the color is not 0. This embodiment can provide finer service flow classification and realize more QoS level control.

The overlay service identification information corresponding to the packet may be obtained from a VPN instance. For example, R1 receives a packet from a CE side which belongs to a vpn-1 instance, that is, the packet is a packet of vpn-1 which belongs to slice-1. When an overlay service has no TE requirement, that is, color=0, the overlay service identification information is slice-id=1, color=0. If the overlay service has a TE requirement, the overlay service identification information is obtained after a value of the color is determined according to the TE requirement.

In one embodiment, a packet is transmitted along an MPLS LSP; and when the packet hits a corresponding FEC to Next Hop Label Forwarding Entry (NHLFE) Map (FTN) entry on an ingress node of the MPLS LSP and the FTN entry includes a preset slice flag, a slice label in the FTN entry hit by the packet is encapsulated in the packet, and the overlay service identification information is also encapsulated in the packet immediately after the slice label. That is, the step of encapsulating the overlay service identification information corresponding to the packet in the packet includes: encapsulating a slice label and the overlay service identification information in a label stack of the packet according to an FTN entry hit by the packet.

Figure 2:
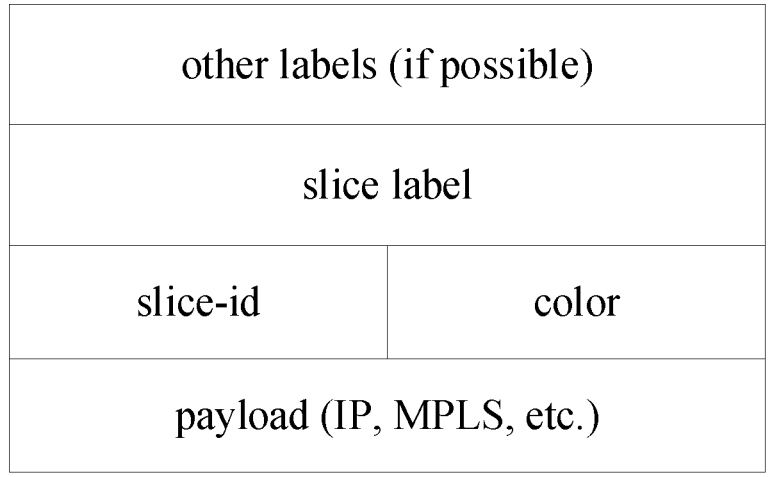
FIG. 2 is a schematic diagram of a packet encapsulation format, in which a slice label is directly followed by overlay service identification and a corresponding IP address according to an embodiment of the present disclosure.

In one embodiment, a position where the overlay service identification information is encapsulated in the label stack and a position where the slice label is encapsulated in the label stack satisfy a preset relationship. For example, the slice label is immediately followed by the overlay service identification information in the label stack. It should be noted that the overlay service identification information may be encapsulated in other appointed positions as required (for example, the overlay service identification information is always placed immediately after a label at the bottom of the stack). FIG. 2 is a schematic diagram illustrating encapsulation of a slice label and overlay service identification information according to one embodiment. As shown in FIG. 2, a label stack includes other labels (if possible), a slice label, overlay service identification information (slice-id+color), and payload (IP, MPLS, etc.). In this embodiment, each of the slice-id and the color is 16 bits long. It should be noted that all of 32 bits may be used to represent slice-id or color in other embodiments. However, no matter how many bits are used for slice-id or color, encapsulation and decapsulation of overlay service identification information in an MPLS packet must be based on consistent understanding of an encapsulation format of the overlay service identification information. In addition, it is merely an example that the overlay service identification information is 32 bits long. More or less bits may be used for the overlay service identification information.

In one embodiment, the method further includes that creating, by the node, an FTN entry including a preset slice flag when the node receives a label binding advertisement carrying preset information. The preset slice flag may be set as required, and is configured to indicate that a binding relationship between a slice FEC and a slice label is represented by the FTN entry. The preset information is configured to indicate that what is carried in the label binding advertisement is the binding relationship between the slice FEC and the slice label, and can be used to distinguish the slice FEC and the slice label from an FEC and a label in the related art. The label binding advertisement is configured to advertise the binding relationship between the slice FEC and the slice label.

In one embodiment, carrying the preset information includes adding a preset flag in existing architecture of label binding advertisement message.

In one embodiment, the carried preset information is that a TYPE field in Label Type Length Value (TLV) information in the label binding advertisement is a preset value. The preset value is different from a value of a TYPE field in a Label TLV in the related art. For example, the Label TLV is a Slice Label TLV which is similar to an existing Generic Label TLV but is different in values of some fields, or the Label TLV is a Slice-Prefix-SD Sub-TLV which is similar to an existing Prefix-SID Sub-TLV but is different in values of some fields, or the Label TLV is a Slice-Label-Index TLV which is similar to a Label-Index TLV but is different in values of some fields. A TLV format may be customized to carry the binding relationship between the slice FEC and the slice label.

In one embodiment, the label binding advertisement further includes encapsulation mode information of overlay service identification information, and the FTN entry including the preset slice flag further includes the encapsulation mode information of overlay service identification information; and the step of encapsulating the overlay service identification information includes: encapsulating the overlay service identification information in the label stack of the packet according to the encapsulation mode information of overlay service identification information in the FTN entry hit by the packet. For example, an encapsulation mode of overlay service identification information is that the overlay service information consists of high 16-bit slice-id and low 16-bit color, or, the overlay service information consists of 32-bit slice-id, or the overlay service information consists of 32-bit color, and the like. It should be noted that the label binding advertisement may not include the encapsulation mode information of overlay service identification information, in which case the overlay service identification information is encapsulated with a predefined mode.

Figure 3A:
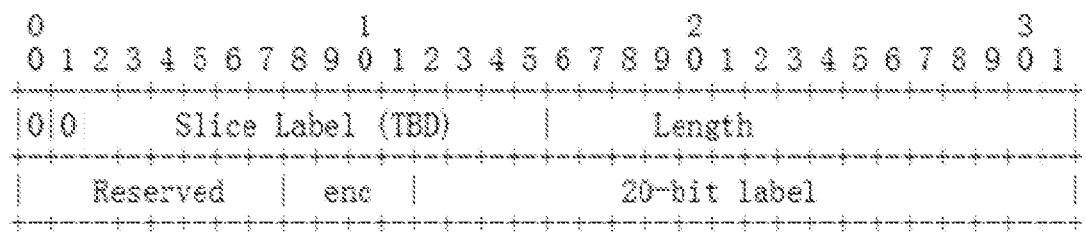

FIG. 3a illustrates an exemplary embodiment that the Label Distribution Protocol (LDP) is extended to support a label binding information advertisement of a slice FEC. Based on RFC5036, a new Slice Label TLV is added, and the Slice Label TLV is very similar to an existing Generic Label TLV except that a value of TYPE is TBD (TBD is a new value to be assigned and is not the same as an existing value); the enc field indicates an encapsulation mode of overlay service identification information (for example, it is indicated that the overlay service information consists of high 16-bit slice-id and low 16-bit color when a value of the enc is 0, but this is merely an example, and the enc may be set to other values as required, or be given more definitions); and definitions of other fields are completely the same as those of the Generic Label TLV. Compared with the implementation that an existing Generic Label TLV or an existing FEC TLV is extended to have a preset flag added therein, the implementation provided by this embodiment, which introduces the new Slice Label TLV, allows an old device that cannot recognize the Slice TLV to directly discard a received label binding information advertisement message of a slice FEC, and allows a new device that can recognize the Slice TLV to process normally and install an entry.

Figure 3B:
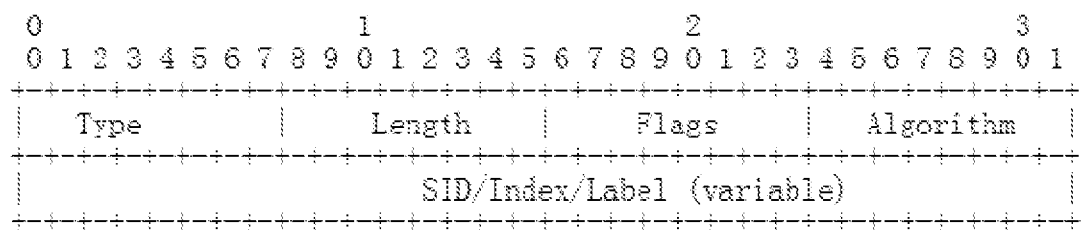

Similarly, FIG. 3b illustrates an exemplary embodiment that the Intermediate System to Intermediate System (ISIS) is extended to support a label binding information advertisement of a slice FEC. Based on draft-ietf-isis-segment-routing-extensions-16, a new Slice-Prefix-SD Sub-TLV is added, and the Slice-Prefix-SD Sub-TLV is very similar to an existing Prefix-SID Sub-TLV except that a value of TYPE is TBD; Slice-Flag bits are added in the Flags field (for example, a value of the Slice-Flag bits may be set to 0, which indicates that the overlay service information consists of high 16-bit slice-id and low 16-bit color, but this is merely an example, and the Slice-Flag bits may be defined as required and set to other values); and definitions of other fields are completely the same as those of the Prefix-SID Sub-TLV. Compared with the implementation that an existing Prefix-SID Sub-TLV or an existing prefix advertisement (such as TLV-135 (Extended IPv4 Reachability) defined in RFC5305, or TLV-235 (Multitopology IPv4 Reachability) defined in RFC5120, or TLV-236 (IPv6 IP Reachability) defined in RFC5308, or TLV-237 (Multitopology IPv6 IP Reachability) defined in RFC 5120) is extended to have a preset flag added therein, the implementation provided by this embodiment, which introduces the new Slice-Prefix-SD Sub-TLV, allows an old device that cannot recognize the Slice-Prefix-SD Sub-TLV to directly discard a received label binding information advertisement message of a slice FEC, and allows a new device that can recognize the Slice-Prefix-SD Sub-TLV to process normally and install an entry.

Similarly, FIG. 3c illustrates an exemplary embodiment that the SR-Border Gateway Protocol (SR-BGP) is extended to support a label binding information advertisement of a slice FEC. Based on draft-ietf-idr-bgp-prefix-sid-20, a new Slice-Label-Index TLV is added and is carried along with a BGP Prefix-SID attribute, and the Slice-Label-Index TLV is very similar to an existing Label-Index TLV except that a value of TYPE is TBD; Slice-Flag bits are added in the Flags field (for example, a value of the Slice-Flag bits may be set to 0, which indicates that the overlay service information consists of high 16-bit slice-id and low 16-bit color, but this is merely an example, and the Slice-Flag bits may be defined as required and set to other values); and definitions of other fields are completely the same as those of the Label-Index TLV. Compared with the implementation that an existing Label-Index TLV or an existing prefix advertisement (such as Labeled IPv4/IPv6 unicast prefixes defined in RFC8277, which is called BGP-LU route for short) is extended to have a preset flag added therein, the implementation provided by this embodiment, which introduces the new Slice-Label-Index TLV, allows an old device that cannot recognize the Slice-Label-Index TLV to directly discard a received label binding information advertisement message of a slice FEC, and allows a new device that can recognize the Slice-Label-Index TLV to process normally and install an entry.

The extension of other MPLS label protocols (such as BGP) and other SR routing protocols (such as Open Shortest Path First (OSPF)) also conforms to the above compatibility principle and will not be described in detail here.

In one embodiment, the step of encapsulating the slice label and the overlay service identification information in the label stack of the packet according to the FTN entry hit by the packet includes: encapsulating the slice label and the overlay service identification information in the label stack of the packet according to the FTN entry hit by the packet when the FTN entry hit by the packet includes a preset slice flag.

In one embodiment, the step of encapsulating the overlay service identification information corresponding to the packet in the packet includes at least one of: encapsulating the overlay service identification information corresponding to the packet in a segment routing header of the packet; or carrying the overlay service identification information corresponding to the packet in a routing extension header newly defined in the packet.

As shown in FIG. 4, an embodiment of the present disclosure provides a transmission control method, including: step 401, when a node receives a packet, forwarding, by the node, the packet using an underlay network resource dedicated to a service corresponding to overlay service identification information carried in the packet.

In one embodiment, the overlay service identification information is carried in a label stack of the packet, and a position of the overlay service identification information in the label stack and a position of a slice label, which is included in an Incoming Label Map (ILM) entry hit by the packet, in the label stack satisfy a preset relationship.

In one embodiment, the overlay service identification information is carried in at least one of: a segment routing header of the packet; or a routing extension header newly defined in the packet.

In one embodiment, before the step of forwarding the packet using the underlay network resource dedicated to the service corresponding to the overlay service identification information carried in the packet, the method further includes performing label swapping by the node according to an ILM entry hit by the packet, with the overlay service identification information in the label stack reserved during the label swapping. For example, a label stack includes label1 and slice-id=1, color=0 before the label swapping, and includes label2 and slice-id=1, color=0 after the label swapping.

In one embodiment, the step of forwarding the packet using the underlay network resource dedicated to the service corresponding to the overlay service identification information carried in the packet includes: forwarding the packet using the underlay network resource dedicated to the service corresponding to the overlay service identification information carried in the packet when an ILM entry hit by the packet includes a preset slice flag. This solution is different from an existing transmission control solution which does not include carrying overlay service identification. When the ILM entry hit by the packet does not include a preset slice flag, the packet is forwarded using the existing solution.

In one embodiment, the method further includes, when the node receives a label binding advertisement carrying preset information, creating the ILM entry including the preset slice flag by the node. The label binding advertisement including the preset information indicates that a current binding relationship is a binding relationship between a slice label and a slice FEC, and a label binding advertisement without the preset information indicates that the current binding relationship is not the binding relationship between the slice label and the slice FEC. The preset information may be an extra flag added in the existing label binding advertisement in addition to the Label TLV, or may be created by setting a value of a Type field in the Label TLV in the label binding advertisement to a preset value (the preset value is different from an already defined value of the Type field in the Label TLV), or a definition of an existing value of the Type field may be modified and the modified value is taken as the preset value. The entry including the preset slice flag indicates that the current binding relationship is the binding relationship between the slice label and the slice FEC, and the entry which does not include the preset slice flag indicates that the current binding relationship is not the binding between relationship the slice label and the slice FEC.

In one embodiment, before the step of forwarding the packet using the underlay network resource dedicated to the service corresponding to the overlay service identification information carried in the packet, the method further includes popping a slice label from a label stack of the packet and popping the overlay service identification information according to an ILM entry hit by the packet.

In one embodiment, the step of popping the overlay service identification information includes: popping the overlay service identification information from the label stack when the ILM entry hit by the packet includes a preset slice flag.

In one embodiment, the method further includes that the node configures an FEC, allocates a slice label to the FEC, and creates an ILM entry, which includes the preset slice flag, for the FEC.

In one embodiment, the method further includes sending, by the node, a label binding advertisement carrying preset information to other node(s), and the preset information is configured to indicate that a current binding relationship is a binding relationship between an FEC and a slice label.

In one embodiment, the label binding advertisement sent by the node further includes encapsulation mode information of overlay service identification information.

In one embodiment, the carried preset information is that a TYPE field in Label TLV information in the label binding advertisement is a preset value, The solutions provided by the present disclosure are applicable to scenarios where the Service Level Agreement (SLA) of most services is guaranteed through shortest path forwarding. In the deployment of existing networks of some large operators, QoS requirements of users are met mainly through network planning to provide enough bandwidth and delay guarantee along shortest paths, for example, parallel links are added in time when the bandwidth is insufficient. However, the network administrators of those networks are worried about results of dynamic TE path calculation of Resource Reservation Protocol Traffic Engineering (RSVP-TE) or even Segment Routing Traffic Engineering (SR-TE), because those TE paths are considered by the majority to be uncontrollable and complex in operation and maintenance. The solutions provided by the present disclosure are also applicable to TE scenarios. Whether for an MPLS-TE LSP in a TE scenario, such as an RSVP-TE LSP or an SR-TE LSP, or for an MPLS Best-effort LSP (MPLS-BE LSP for short) in a non-TE scenario, such as an LDP LSP, a BGP LSP, or an SR Best-effort (SR-BE for short) LSP, an MPLS slice LSP can be created with the upgrading method provided by the present disclosure. The upgrading method described in the present disclosure is to create a single MPLS slice LSP for a certain FEC to serve a plurality of different slices, and the MPLS slice LSP is called MPLS-TE LSP with slice-capability or MPLS-BE LSP with slice-capability, that is, the MPLS slice LSP is created not for a specific slice, but the MPLS slice LSP has the capability of carrying slice information, and the forwarding information included in the MPLS slice LSP is irrelevant to specific slices. According to a tunnel policy, an overlay service of a specific slice may be carried through an MPLS-TE LSP with slice-capability or an MPLS-BE LSP with slice-capability, and may also be carried through a conventional MPLS-TE LSP or MPLS-BE LSP.

1) As for the Creation of an MPLS-BE LSP with Slice-Capability:

On a node D in an MPLS network, a loopback route of the node D may be configured to function as an Forwarding Equivalence Class with slicing capability, which is called FEC with slice-capability (hereinafter referred to as slice FEC for short), an MPLS label with slicing capability, which is called label with slice-capability (hereinafter referred to as slice label for short), is allocated to the slice FEC, a corresponding ILM entry is created, and a preset slice flag is set in the ILM entry, so that a packet which hits the ILM entry is processed using a corresponding underlay network resource (i.e. an underlay network resource dedicated to a service indicated by overlay service identification information) according to overlay service identification information after a slice label in a label stack of the packet. The node D may send an advertisement of a binding relationship between the slice FEC and the corresponding slice label to another node S using a label protocol, such as LDP, BGP, and SR (herein, specifically referring to SR-MPLS, that is, SR uses an MPLS forwarding plane). After receiving the advertisement, the node S may allocate an MPLS label to the slice FEC and create a corresponding ILM entry, a preset slice flag is set in the entry, and a label operation is SWAP (swapping), so that a packet which hits the ILM entry is forwarded using an underlay network resource according to overlay service identification information after a slice label in a label stack of the packet, the underlay network resource being dedicated to a service indicated by the overlay service identification information; moreover, the node S may create a corresponding FTN entry for the slice FEC and set a preset slice flag in the FTN entry, so that a packet which hits the FTN entry encapsulates both a slice label and overlay service identification information (which may be encapsulated immediately after the slice label), and then the packet is forwarded using an underlay network resource dedicated to a service indicated by the overlay service identification information.

2) As for the Creation of an MPLS-TE LSP with Slice-Capability:

The creation of an MPLS-TE LSP with slice-capability is similar to that of an MPLS-BE LSP with slice-capability, except that a corresponding TE FEC on a head node of a TE LSP is configured to function as an FEC with slice-capability, so that the head node can trigger the creation of an MPLS-TE slice LSP. The two cases of RSVP-TE and SR-TE will be discussed in the following description of exemplary embodiments.

An embodiment of the present disclosure provides a mechanism for advertising and forwarding an MPLS slice label, including the following steps.

As for the creation of an MPLS-BE LSP with slice-capability:

at a first step, on a node D in an MPLS network, a loopback route (prefix-D) of the node D is configured to function as a slice FEC, which is not of a new FCE type, but is a common prefix FEC with a preset slice flag. For example, in the cases of using LDP, or BGP protocols, an MPLS label may be allocated to the prefix-D as usual, and a corresponding ILM entry may be created and has a preset slice flag set therein; in the cases of using SR-MPLS protocols, such as ISIS, OSPF, or BGP, prefix-sid (Segment ID) may be allocated to the prefix-D as usual, and a corresponding ILM entry may be created and has a preset slice flag set therein.

The node D is used as an egress node of the slice FEC, and a label operation in the ILM entry is POP and the ILM entry includes the preset slice flag. When a node receives a packet which hits the ILM entry, a top slice label and overlay service identification information immediately after the slice label are popped by the node from a label stack of the packet, and then processes the packet using an underlay network resource dedicated to a service corresponding to the overlay service identification information. The overlay service identification information may include two parts: slice-id and color.

At a second step, the node D advertises a label binding message of the slice FEC to a neighboring node S using an MPLS label protocol.

All of the MPLS label protocols (such as LDP or BGP) and SR routing protocols (such as ISIS, OSPF, or BGP), which can support advertisement of a label binding message of a prefix-type FEC, may be extended to support the advertisement of label binding information of a slice FEC.

In one embodiment, the advertisement of label binding information of the slice FEC may be supported by adding a preset flag to an existing FEC advertisement message (i.e. the above label binding advertisement). The preset flag may be the above preset slice flag, or another flag. In another embodiment, the label binding information of the slice FEC is advertised by setting a TYPE field in an FEC advertisement message to a value different from an existing value.

After receiving the label binding advertisement of the slice FEC, the node S may serve as a transit node (i.e., an intermediate node) of the slice FEC to allocate a slice label to the slice FEC and create a corresponding ILM entry for the slice FEC, a preset slice flag is set in the ILM entry, and a label operation in the ILM entry is SWAP. When receiving an MPLS packet which hits the ILM entry, the node performs label swapping on a top slice label of the packet, and then forwards the packet using an underlay network resource according to overlay service identification information immediately after the slice label in the packet, the underlay network resource being dedicated to a service corresponding to the overlay service identification information, and the overlay service identification information in the packet is reserved during the forwarding of the packet. In some special scenarios, such as tracerout, the node S may find that Time to Live (TTL) of a top slice label in an MPLS packet is overran after receiving the MPLS packet, and so the node S will perform FEC check and label check according to RFC8029. In order to avoid affecting check results, the overlay service identification information immediately after the slice label should be ignored and should not be mistakenly taken as a label.

The node S may also serve as an ingress node of the slice FEC to create a corresponding FTN entry for the slice FEC and set a preset slice flag in the FTN entry. When receiving the packet which hits the FTN entry, the node not only encapsulates a slice label in the packet, but also encapsulates overlay service identification information immediately after the slice label in the packet. It should be noted that the overlay service identification information encapsulated immediately after the slice label in the packet cannot be taken as a label, and does not affect the setting of the fields of EXP, TTL, and S of the slice label in the packet, and the overlay service identification information and the slice label are regarded as a whole.

Exemplary Embodiment One

Figure 6:
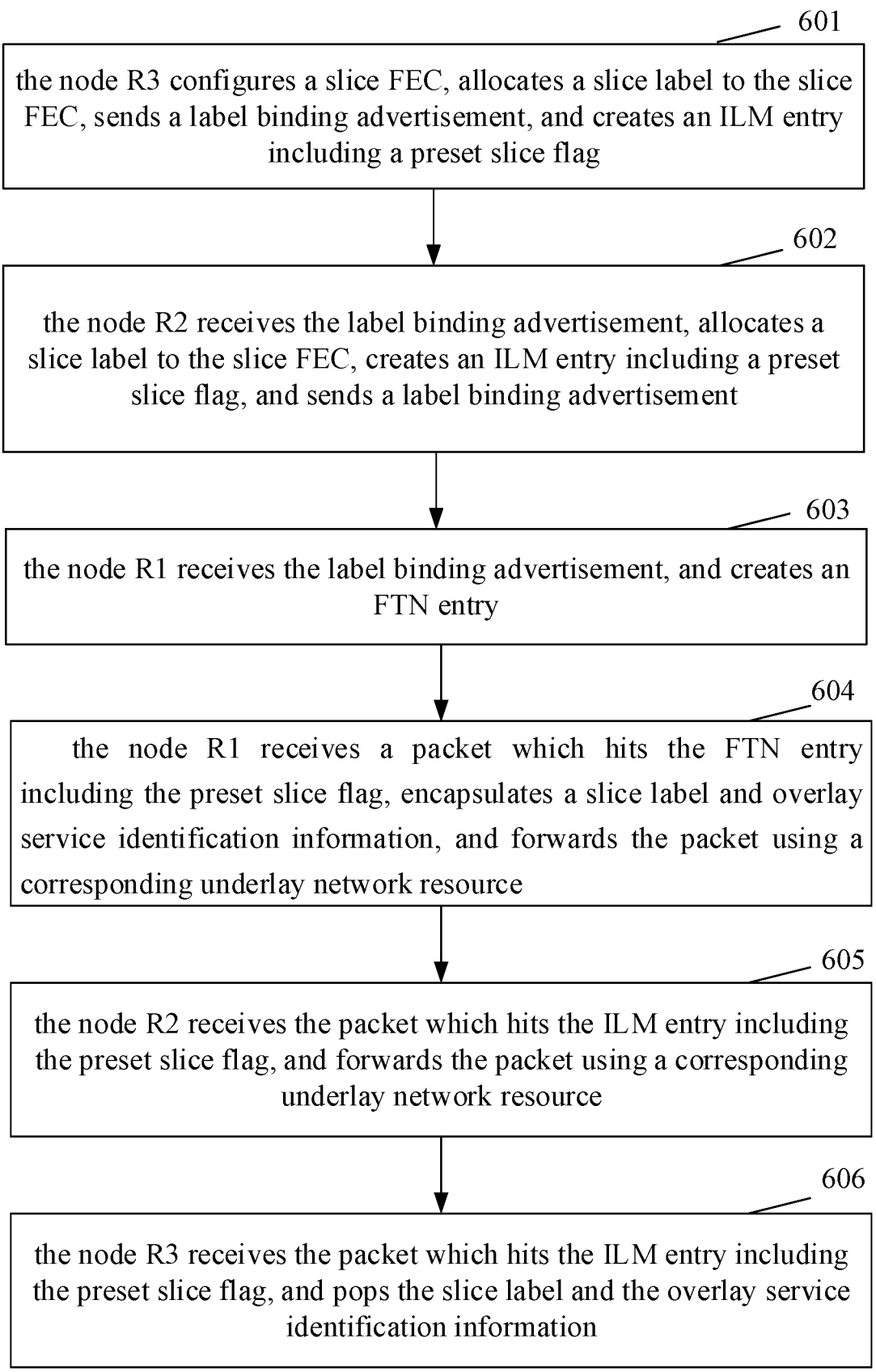
FIG. 6 is a flowchart according to the Exemplary Embodiment One of the present disclosure.

An LDP LSP with slice-capability is described in this embodiment. In an MPLS carrying network shown in FIG. 5, IGP (such as ISIS) and LDP are enabled on each node (R1, R2, and R3) and Layer 3 ports (port1, port2, port3, and port4). In addition, in order to support 5G slicing, each of the Layer 3 ports is divided into a plurality of Layer 2 subports which are allocated to different slices, for example, sub-if-1 of each Layer 3 port is allocated to slice-1, sub-if-2 to slice-2, and sub-if-3 to slice-3. It should be noted that the subports are not subjected to complex configuration for simplifying network planning, for example, no extra IP addresses are configured for the subports and IGP or LDP protocol are not enabled on the subports. Supposing that three Layer 3 (L3) VPN services, namely vpn-1, vpn-2, and vpn-3, exist, the nodes R1 and R3 serve as VPN access devices, the nodes R1 and R3 are configured to assign corresponding Virtual Routing Forwarding (VRF) instances, namely vrf1, vrf2 and vrf3, to slice-1, slice-2 and slice-3 respectively, CE1-1 and CE1-2 are clients of vrf1, CE2-1 and CE2-2 are clients of vrf2, and CE3-1 and CE3-2 are clients of vrf3. VPN routes may be advertised and learned between the nodes R1 and R3 using BGP. As shown in FIG. 6, the transmission control method provided in this embodiment includes the following steps 601 to 606.

At step 601, an MPLS-BE slice LSP is created from the node R1 to the node R3 using LDP, with the node R1 serving an ingress node of the LSP, the node R2 as a transit node, and the node R3 as an egress node. For this reason, a loopback route (such as prefix-R3) on the node R3 is configured to function as a slice FEC, and the node R3 allocates an incoming slice label, namely label3, to prefix-R3, and meanwhile advertises a binding relationship between prefix-R3 and label3 to the upstream neighboring node R2 using LDP (instead of a Generic Label TLV, a Slice Label TLV is included in the advertisement message). An ILM entry is created on the node R3, includes a label operation of POP, has a preset slice flag set therein, and indicates a role of an egress node.

At step 602, after receiving the label binding advertisement from the node R3, the node R2 allocates a new incoming slice label, namely label2, to prefix-R3, and meanwhile advertises a binding relationship between prefix-R3 and label2 to the upstream neighboring node R1 using LDP. An ILM entry including a preset slice flag is created on the node R2; and in the ILM entry, a label operation is SWAP, which indicates a role of a transit node, an outgoing port for forwarding is port3, and an outgoing label is label3.

At step 603, after receiving the label binding advertisement from the node R2, the node R1 creates an FTN entry, which includes a preset slice flag, and indicates a role of an ingress node; and in the FTN entry, an outgoing port for forwarding is port1, and an outgoing label is label2.

At step 604, the node R1 learns the VPN routes related to vpn-1, vpn-2 and vpn-3 from the node R3 using BGP. Supposing that VPN labels carried along with the advertisement of the routes are vpn-label1, vpn-label2 and vpn-label3 respectively, and all of the VPN routes are iterated to the above MPLS-BE slice LSP created using LDP according to a next hop (R3) of BGP, that is, to the FTN entry created on the node R1. Since the FTN entry includes the preset slice flag, carrying overlay service identification information of a VPN service is supported in encapsulation of a packet, so that the overlay service identification information of the VPN service may be provided when the VPN route is iterated to an MPLS LSP of a public network, so as to map onto a specific underlay network resource. For example, for a packet to be forwarded from CE1-1 to CE1-2, an encapsulated label stack of the packet on the node R1 is as follows:
  outer label: label2
  overlay service identification: slice-id=1, color=0
  inner label: vpn-label1

When forwarding the packet to the node R2, the node R1 uses an underlay network resource dedicated to <slice-id=1, color=0>, such as subport port1.sub-if-1 dedicated to slice-1 and a queue thereof described in this embodiment. At this time, a feasible queue scheduling solution may be to select a queue for the packet to enter from a local queue resource of subport port1.sub-if-1 by using the color as a queue scheduling factor. Or, other queue scheduling solutions may be adopted.

At step 605, after being received by the node R2, the packet hits the ILM entry according to the top label2. Since the ILM entry hit by the packet includes the preset slice flag, the node R2 knows that label2 is immediately followed by 32-bit overlay service identification information <slice-id=1, color=0> in the packet. Therefore, the node R2 swaps label2 for label3 according to the label operation of SWAP in the ILM entry hit by the packet, and then forwards the packet to the node R3 using an underlay network resource dedicated to <slice-id=1, color=0>, such as subport port3.sub-if-1 and a queue thereof described in this embodiment. During the forwarding of the packet, the overlay service identification information is not popped from the packet.

At this time, the label stack is as follows:
outer label: label3
overlay service identification: slice-id=1, color=0
inner label: vpn-label1
the overlay service identification is reserved.

At step 606, after being received by the node R3, the packet hits the ILM entry according to the top label3. Since the ILM entry hit by the packet includes the preset slice flag, the node R3 knows that label3 is immediately followed by the 32-bit overlay service identification information <slice-id=1, color=0> in the packet. Therefore, the node R3 pops label3 and the overlay service identification information according to the label operation of POP in the ILM entry hit by the packet, searches a table according to vpn-label1 and an IP payload of private network, and then forwards the packet to CE1-2. For forwarding the packet, it is possible to still use <slice-id=1, color=0> to determine a network resource (such as a queue) dedicated to CE1-2 at a client side in a private network. It should be noted that the packet may be forwarded without using the underlay network resource corresponding to <slice-id=1, color=0>.

Similarly, a packet from CE2-1 to CE2-2, and a packet from CE3-1 to CE3-2 are forwarded using the underlay network resources dedicated to slice-2 and slice-3, respectively.

It can be known from the above steps that the overlay service identification information can be carried when the packet is forwarded along the MPLS-BE slice LSP, which greatly overcomes the defect that QoS of an MPLS packet can only be measured according to a 3-bit EXP (or referred to as TC) field in a label in the packet, because the 32-bit overlay service identification information <slice-id, color> can provide finer flow classification than the 3-bit EXP does.

It should be noted that a node may simultaneously serve as an ingress node, an intermediate node, and an egress node for different LSPs. It is possible that both an FTN entry and an ILM entry are created on a node.

Exemplary Embodiment Two

Figure 7:
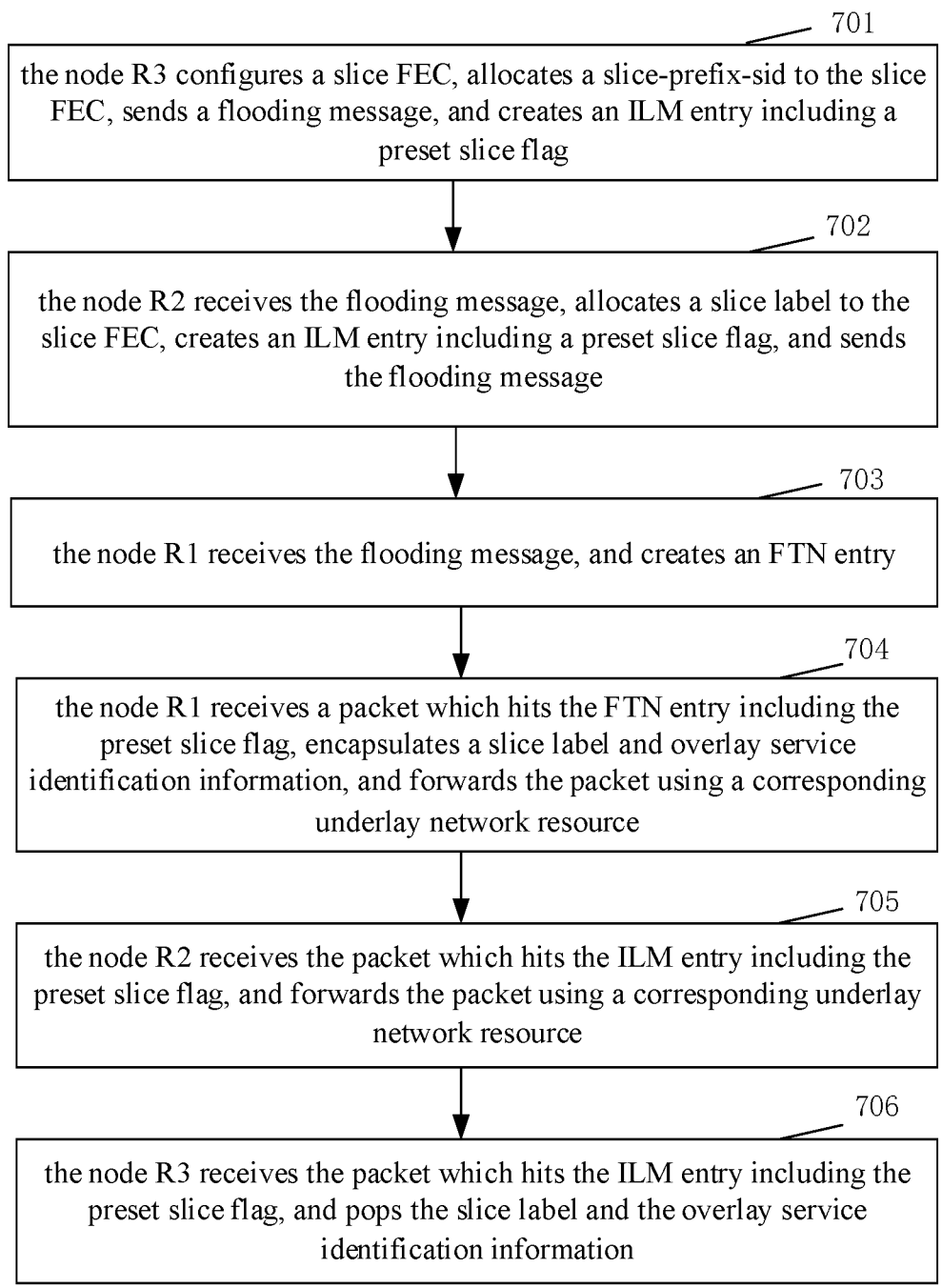
FIG. 7 is a flowchart according to the Exemplary Embodiment Two of the present disclosure.

The network structure used in this embodiment is shown in FIG. 5. The creation of SR-BE with slice-capability using IGP is described in this embodiment, and SR (such as ISIS-SR), instead of LDP, is used to create an MPLS-BE slice LSP in this embodiment. As shown in FIG. 7, the transmission control method provided in this embodiment includes the following steps 701 to 706.

At step 701, an MPLS-BE slice LSP is created from the node R1 to the node R3 using SR. For this reason, a loopback route (such as prefix-R3) on the node R3 is configured to function as a slice FEC, and a corresponding slice-prefix-sid (such as sid3) is configured for prefix-R3 within an SR function, and is flooded over the network with prefix-R3 (a Slice-Prefix-SD Sub-TLV is included in the prefix flooding message). An ILM entry is created on the node R3 (assuming that an absolute label, namely label3, is obtained through conversion of SR Global Blocks (SRGBs) of sid3 and R3), includes a label operation of POP, has a preset slice flag set therein, and indicates a role of an egress node.

At step 702, after receiving the prefix-R3 flooding message from the node R3, the node R2 continues to flood the prefix-R3 flooding message to the node R1. Meanwhile, an ILM entry including a preset slice flag is created on the node R2 (assuming that an absolute label, namely label2, is obtained through conversion of SRGBs of sid3 and R2); and in the ILM entry, a label operation is SWAP, which indicates a role of a transit node, an outgoing port for forwarding is port3, and an outgoing label is label3.

At step 703, after receiving the prefix-3 flooding message from the node R2, the node R1 creates an FTN table entry, which includes a preset slice flag and indicates a role of an ingress node; and in the FTN entry, an outgoing port for forwarding is port1, and an outgoing label is label2.

At step 704, a subsequent process of forwarding a packet along the MPLS-BE slice LSP with an VPN service carried is similar to that in the Exemplary Embodiment One: the node R1 learns the VPN routes related to vpn-1, vpn-2 and vpn-3 from the node R3 using BGP. Supposing that VPN labels carried along with the advertisement of the routes are vpn-label1, vpn-label2 and vpn-label3 respectively, and all of the VPN routes are iterated to the above MPLS-BE slice LSP created using LDP according to a next hop (R3) of BGP, that is, to the FTN entry created on the node R1. Since the FTN entry includes the preset slice flag, carrying overlay service identification information of a VPN service is supported in encapsulation of a packet, so that the overlay service identification information of the VPN service can be provided when the VPN route is iterated to an MPLS LSP of a public network, so as to map onto a specific underlay network resource. For example, for a packet to be forwarded from CE1-1 to CE1-2, an encapsulated label stack of the packet on the node R1 is as follows:
outer label: label2
overlay service identification: slice-id=1, color=0
inner label: vpn-label1

When forwarding the packet to the node R2, the node R1 uses an underlay network resource dedicated to <slice-id=1, color=0>, such as subport port1.sub-if-1 dedicated to slice-1 and a queue thereof described in this embodiment. At this time, a feasible queue scheduling solution may be to select a queue for the packet to enter from a local queue resource of subport port1.sub-if-1 by using the color as a queue scheduling factor. Or, other queue scheduling solutions may be adopted.

At step 705, after being received by the node R2, the packet hits the ILM entry according to the top label2. Since the ILM entry hit by the packet includes the preset slice flag, the node R2 knows that label2 is immediately followed by 32-bit overlay service identification information <slice-id=1, color=0> in the packet. Therefore, the node R2 swaps label2 for label3 according to the label operation of SWAP in the ILM entry hit by the packet, and then forwards the packet to the node R3 using an underlay network resource dedicated to <slice-id=1, color=0>, such as subport port3.sub-if-1 and a queue thereof described in this embodiment. During the forwarding of the packet, the overlay service identification information is not popped from the packet.

At step 706, after being received by the node R3, the packet hits the ILM entry according to the top label3. Since the ILM entry hit by the packet includes the preset slice flag, the node R3 knows that label3 is immediately followed by the 32-bit overlay service identification information <slice-id=1, color=0> in the packet. Therefore, the node R3 pops label3 and the overlay service identification information according to the label operation of POP in the ILM entry hit by the packet, searches a table according to vpn-label1 and an IP payload of private network, and then forwards the packet to CE1-2. For forwarding the packet, it is possible to still use <slice-id=1, color=0> to determine a network resource (such as a queue) dedicated to CE1-2 at a client side in a private network. It should be noted that the packet may be forwarded without using the underlay network resource corresponding to <slice-id=1, color=0>.

Exemplary Embodiment Three

Figure 8:
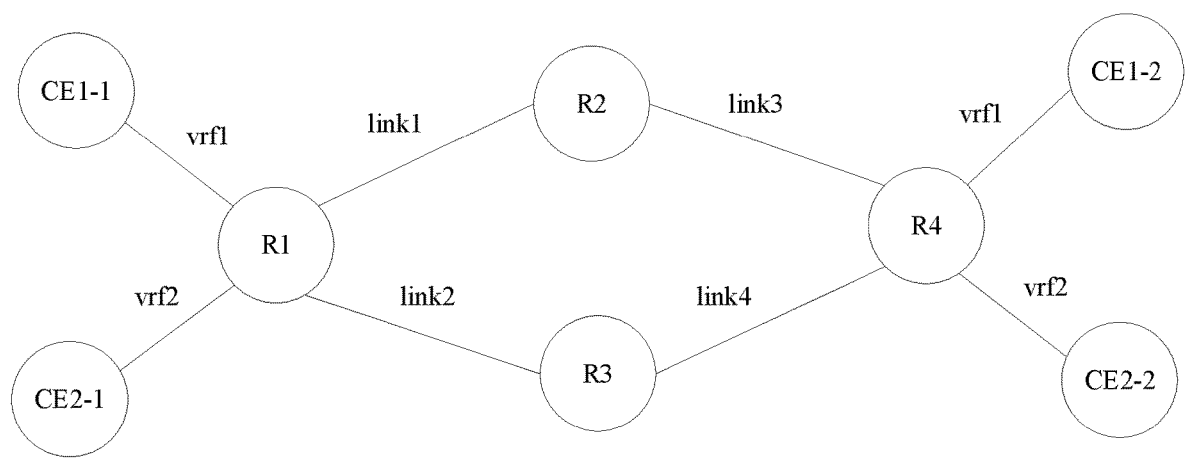
FIG. 8 is a diagram of a network topology according to Exemplary Embodiment Three of the present disclosure.
Figure 9:
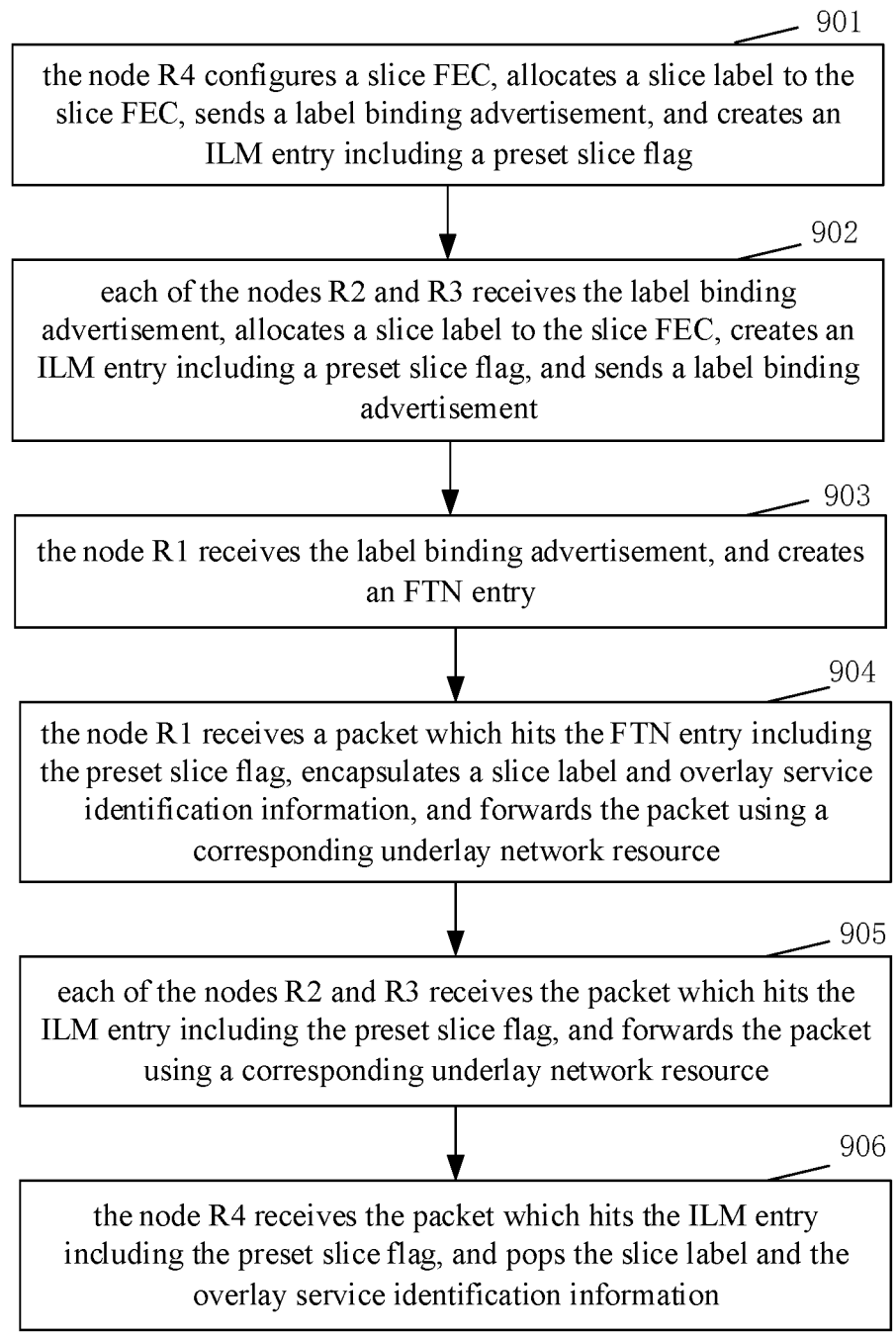
FIG. 9 is a flowchart according to the Exemplary Embodiment Three of the present disclosure.

This embodiment is similar to the Exemplary Embodiment One. In this embodiment, physical links are allocated to different slices. As shown in FIG. 8, IGP (such as ISIS) and LDP are enabled on each node (R1, R2, R3, and R4) and L3 links (link1, link2, link3, and link 4). In addition, link1 and link3 are allocated to slice-1, and link2 and link4 are allocated to slice-2. Supposing that two L3 VPN services, namely vpn-1 and vpn-2, exist, the nodes R1 and R4 serve as Provider Edge (PE) devices, the nodes R1 and R4 are configured to assign corresponding VRF instances, namely vrf1 and vrf2, to slice-1 and slice-2 respectively, CE1-1 and CE1-2 are clients of vrf1, and CE2-1 and CE2-2 are clients of vrf2. VPN routes may be advertised and learned between the nodes R1 and R4 using BGP. As shown in FIG. 9, the transmission control method provided in this embodiment includes the following steps.

At step 901, an MPLS-BE slice LSP is created from the node R1 to the node R4 using LDP. For this reason, a loopback route (such as prefix-R4) on the node R4 is configured to function as a slice FEC, and the node R4 allocates an incoming label, namely label4, to prefix-R4, and meanwhile advertises a binding relationship between prefix-R4 and label4 to the upstream neighboring nodes R2 and R3 using LDP. An ILM entry is created on the node R4, includes a label operation of POP, has a preset slice flag set therein, and indicates a role of an egress node.

At step 902, after receiving the slice label advertisement from the node R4, the node R2 allocates a new incoming label, namely label2, to prefix-R4, and meanwhile advertises a binding relationship between prefix-R4 and label2 to the upstream neighboring node R1 using LDP. An ILM entry including a preset slice flag is created on the node R2; and in the ILM entry, a label operation is SWAP, which indicates a role of a transit node, an outgoing port for forwarding is link3, and an outgoing label is label4.

The node R3 receives the slice label advertisement from the node R4 as well. Like the node R2, the node R3 allocates a new incoming label, namely label3, to prefix-R4, and advertises a binding relationship between prefix-R4 and label3 to the upstream neighboring node R1. An ILM entry including a preset slice flag is created on the node R3; and in the ILM entry, a label operation is SWAP, which indicates a role of a transit node, an outgoing port for forwarding is link4, and an outgoing label is label4.

At step 903, after receiving the label binding advertisements from the nodes R2 and R3, the node R1 creates an FTN entry, which includes a preset slice flag, indicates a role of an ingress node, and contains forwarding information of "an outgoing port is link1, and an outgoing label is label2" and "an outgoing port is link2, and an outgoing label is label3", thereby creating an Equivalent Cost Multi-path (ECMP).

At step 904, the node R1 learns the VPN routes related to vpn-1 and vpn-2 from the node R3 using BGP. Supposing that VPN labels carried along with the advertisement of the routes are vpn-label1 and vpn-label2 respectively, and both of the VPN routes are iterated to the above MPLS-BE slice LSP created using LDP according to a next hop (R4) of BGP, that is, to the FTN entry created on the node R1. Since the FTN entry includes the preset slice flag, carrying overlay service identification information of a VPN service is supported in encapsulation of a packet, so that the overlay service identification information of the VPN service may be provided when the VPN route is iterated to an MPLS LSP of a public network, so as to map onto a specific underlay network resource. For example, for a packet to be forwarded from CE1-1 to CE1-2, an encapsulated label stack of the packet on the node R1 is as follows:

outer label: label2
overlay service identification: slice-id=1, color=0
inner label: vpn-label1

The node R1 forwards the packet to the node R2 using an underlay network resource dedicated to <slice-id=1, color=0>, such as link1 dedicated to slice-1 and a queue thereof described in this embodiment. That is, when the VPN route is iterated to an ECMP of a public network to forward information, only a specific ECMP member, which belongs to a corresponding slice, in the ECMP is used according to overlay service identification information.

For a packet to be forwarded from CE2-1 to CE2-2, an encapsulated label stack of the packet on the node R1 is as follows:

outer label: label3
overlay service identification: slice-id=2, color=0
inner label: vpn-label2

The node R1 forwards the packet to the node R3 using an underlay network resource dedicated to <slice-id=2, color=0>, such as link2 dedicated to slice-2 and a queue thereof described in this embodiment.

At step 905, after being received by the node R2, the packet hits the ILM entry according to the top label2. Since the ILM entry includes the preset slice flag, the node R2 knows that label2 is immediately followed by 32-bit overlay service identification information <slice-id=1, color=0> in the packet. Therefore, the node R2 swaps label2 for label4 according to the label operation of SWAP in the ILM entry, and then forwards the packet to the node R4 using an underlay network resource dedicated to <slice-id=1, color=0>, such as link3 and a queue thereof described in this embodiment. During the forwarding of the packet, the overlay service identification information is not popped from the packet.

Similarly, after receiving the packet, the node R3 swaps label3 for label4 and then forwards the packet to the node R4 using an underlay network resource dedicated to <slice-id=2, color=0>, such as link4 and a queue thereof described in this embodiment. During the forwarding of the packet, the overlay service identification information is not popped from the packet.

Step 906, after the node R4 receives the packet from the node R2, the packet hits the ILM entry according to the top label4. Since the ILM entry hit by the packet includes the preset slice flag, the node R4 knows that label4 is immediately followed by the 32-bit overlay service identification information <slice-id=1, color=0> in the packet. Therefore, the node R4 pops label4 and the overlay service identification information according to the label operation of POP in the ILM entry hit by the packet, searches a table according to vpn-label1 and an IP payload of private network, and then forwards the packet to CE1-2. For forwarding the packet, it is possible to still use <slice-id=1, color=0> to determine a network resource dedicated to CE1-2 at a client side in a private network.

Similarly, after receiving the packet from the node R3, the node R4 pops label4 and the overlay service identification information, searches a table according to vpn-label2 and an IP payload of private network, and then forwards the packet to CE2-2. For forwarding the packet, it is possible to still use <slice-id=2, color=0> to determine a network resource dedicated to CE2-2 at a client side in a private network.

Exemplary Embodiment Four

Figure 10:
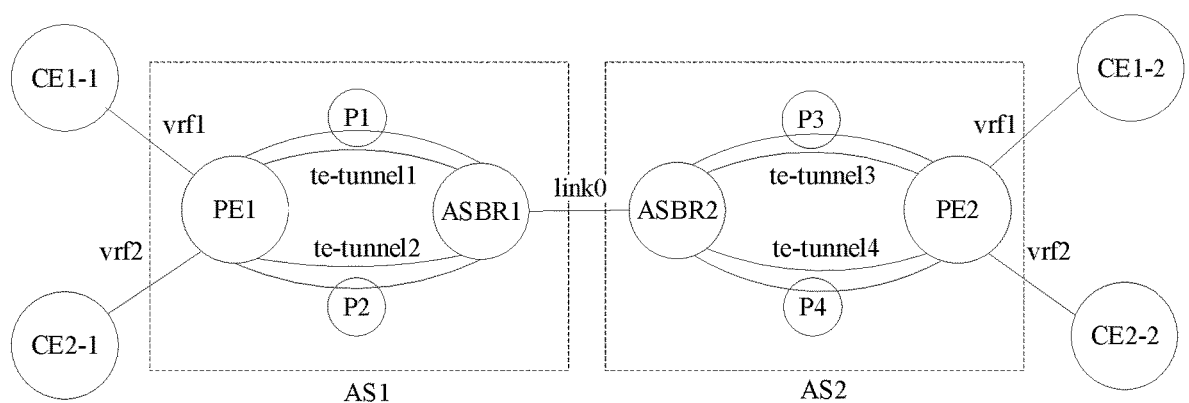
FIG. 10 is a diagram of a network topology according to Exemplary Embodiment Four of the present disclosure.
Figure 11:
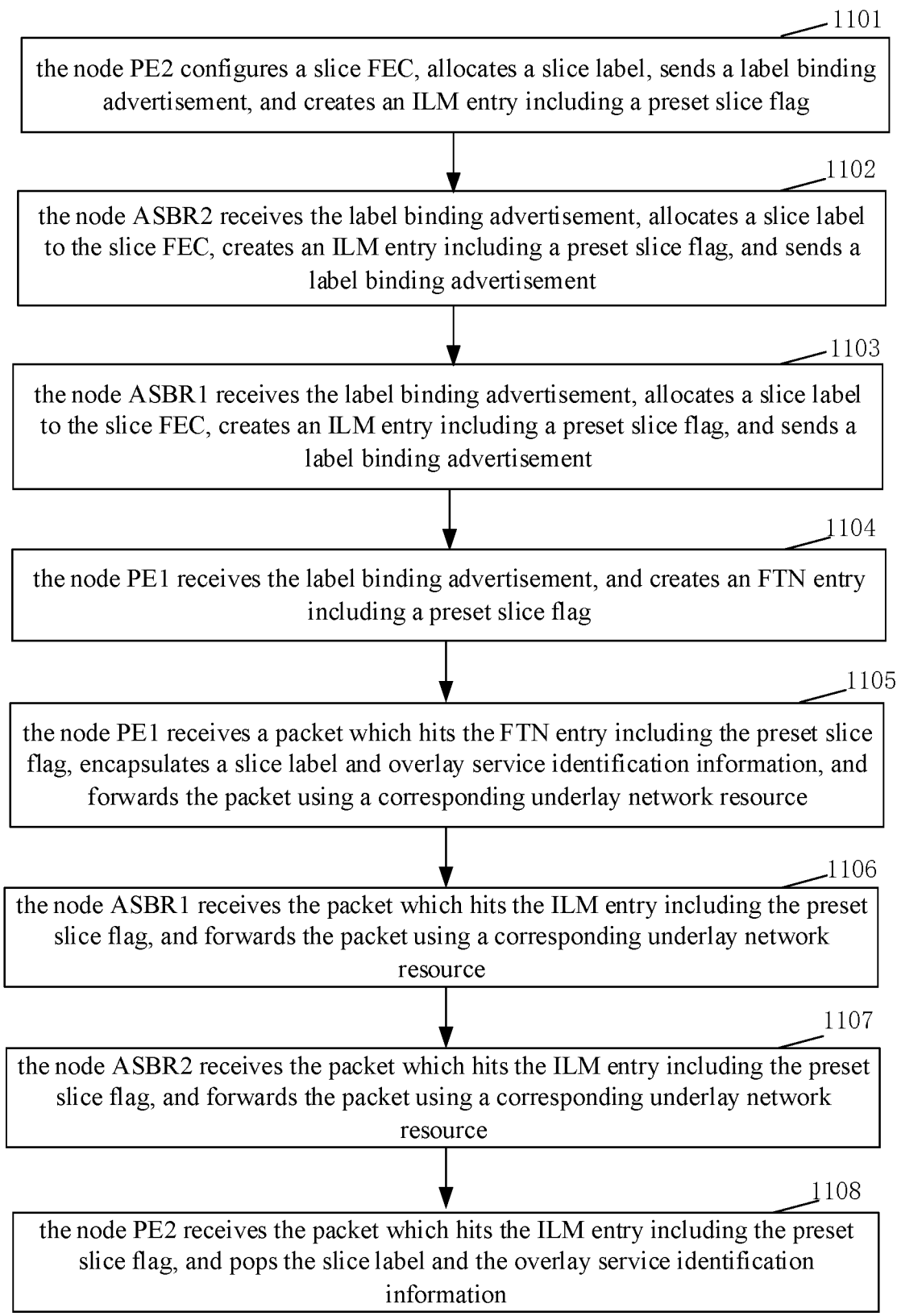
FIG. 11 a flowchart according to the Exemplary Embodiment Four of the present disclosure.

The creation of SR-BE with slice-capability using BGP-LU is described in this embodiment. This embodiment is similar to the Exemplary Embodiment Two, except that an inter-domain MPLS-BE slice LSP is created using BGP-LU. As shown in FIG. 10, PE1 and PE2 belong to different autonomous systems (ASs), has an inter-domain BGP LSP created therebetween, and advertises and learns VPN routes from each other using BGP. IGP is enabled in each AS. In AS1, it is configured on a head node of te-tunnel1 that te-tunnel1 is allocated to slice-1, and it is configured on a head node of te-tunnel2 that te-tunnel2 is allocated to slice-2; in the AS2, it is configured on a head node of te-tunnel3 that te-tunnel3 is allocated to slice-1, and it is configured on a head node of te-tunnel4 that te-tunnel4 is allocated to slice-2. It should be noted that these te-tunnels dedicated to a certain slice usually meet a TE requirement corresponding to an overlay service (that is, color of the te-tunnels is consistent with color of the overlay service). An inter-domain link, namely link0, is configured and can be used by all slices. Supposing that two L3 VPN services, namely vpn-1 and vpn-2, exist, PE1 and PE2 are configured to assign corresponding VRF instances, namely vrf1 and vrf2, to slice-1, slice-2 and slice-3 respectively, CE1-1 and CE1-2 are clients of vrf1, and CE2-1 and CE2-2 are clients of vrf2. As shown in FIG. 11, the transmission control method provided in this embodiment includes the following steps.

At step 1101, an MPLS-BE slice LSP is created from the node PE1 to the node PE2 using BGP-LU. For this reason, a loopback route (such as prefix-PE2) on the node PE2 is configured to function as a slice FEC, and the node PE2 allocates an incoming label, namely label-pe2, to prefix-PE2, and meanwhile advertises prefix-PE2 to an upstream neighbor ASBR2 using BGP, with a Slice-Label-Index TLV carried along with a BGP Prefix-SID attribute. An ILM entry is created on the node PE2, includes a label operation of POP, has a preset slice flag set therein, and indicates a role of an egress node.

At step 1102, after receiving the advertised route prefix-PE2 from the node PE2, the node ASBR2 allocates a new incoming label, namely label-asbr2, to prefix-PE2, and meanwhile sends an advertisement to an upstream neighbor ASBR1 using BGP. An ILM entry including a preset slice flag is created on the node ASBR2; and in the ILM entry, a label operation is SWAP, which indicates a role of a transit node, a remote next hop is PE2, and an outgoing label is label-pe2.

At step 1103, after receiving the advertised route prefix-PE2 sent by the node ASBR2, the node ASBR1 allocates a new incoming label, namely label-asbr1, to prefix-PE2, and meanwhile sends an advertisement to the upstream neighbor PE1 using BGP. An ILM entry including a preset slice flag is created on the node ASBR1; and in the ILM entry, a label operation is SWAP, which indicates a role of a transit node, a directly-connected next hop is ASBR2, an outgoing port is link0, and an outgoing label is label-asbr2.

At step 1104, after receiving the advertised route prefix-PE2 sent by the node ASBR1, the node PE1 creates an FTN entry, which includes a preset slice flag, and indicates a role of an ingress node; and in the FTN entry, a remote next hop is ASBR1, and an outgoing label is label-asbr1.

At step 1105, the node PE1 learns the VPN routes related to vpn-1 and vpn-2 from the node PE2 using BGP. Supposing that VPN labels carried along with the advertisement of the routes are vpn-label1 and vpn-label2 respectively, and both of the VPN routes are iterated to the above MPLS-BE slice LSP created using BGP-LU according to a next hop (PE2) of BGP, that is, to the FTN entry created on the node PE1. Since the FTN entry includes the preset slice flag, carrying overlay service identification information of a VPN service is supported in encapsulation of a packet, so that the overlay service identification information of the VPN service may be provided when the VPN route is iterated to an MPLS LSP of a public network, so as to map onto a specific underlay network resource. For example, for a packet to be forwarded from CE1-1 to CE1-2, an encapsulated label stack of the packet on the node PE1 is as follows:

outer label: label of te-tunnel1
secondary outer label: label-asbr1
overlay service identification: slice-id=1, color=100
inner label: vpn-label1

When forwarding the packet to the node ASBR1, the node PE1 uses an underlay network resource dedicated to <slice-id=1, color=100>, such as te-tunnel1 dedicated to slice-1 described in this embodiment. That is, when the VPN route is iterated to a BGP-LU route in a public network, the BGP-LU route is continuously iterated to the outer tunnel te-tunnel1 belonging to the corresponding slice according to the overlay service identification information.

For a packet to be forwarded from CE2-1 to CE2-2, an encapsulated label stack of the packet on the node R1 is as follows:

outer label: label of te-tunnel2
secondary outer label: label-asbr1
overlay service identification: slice-id=2, color=200
inner label: vpn-label2

When forwarding the packet to the node ASBR1, the node PE1 uses an underlay network resource dedicated to <slice-id=2, color=200>, such as te-tunnel2 dedicated to slice-2 in this embodiment. That is, when the VPN route is iterated to a BGP-LU route in a public network, the BGP-LU route is continuously iterated to the outer tunnel te-tunnel2 belonging to the corresponding slice according to the overlay service identification information.

At step 1106, for the packet forwarded from CE1-1 to CE1-2, the tunnel label of te-tunnel1 is terminated after the node ASBR1 receives the packet, and the packet hits the ILM entry according to the top label-asbr1. Since the ILM entry hit by the packet includes the preset slice flag, the node ASBR1 knows that label-asbr1 is immediately followed by 32-bit overlay service identification information <slice-id=1, color=100> in the packet. Therefore, the node ASBR1 swaps label-asbr1 for label-asbr2 according to the label operation of SWAP in the ILM entry hit by the packet, and then forwards the packet to the node ASBR2 using an underlay network resource dedicated to <slice-id=1, color=100>, such as link0 shared by multiple services and a queue thereof described in this embodiment. During the forwarding of the packet, the overlay service identification information is not popped from the packet.

At step 1107, after being received by the node ASBR2, the packet hits the ILM entry according to the top label-asbr2. Since the ILM entry hit by the packet includes the preset slice flag, the node ASBR2 knows that label-asbr2 is immediately followed by the 32-bit overlay service identification information <slice-id=1, color=100> in the packet. Therefore, the node ASBR2 swaps label-asbr2 for label-pe2 according to the label operation of SWAP in the ILM entry, and then forwards the packet to PE2 using the underlay network resource dedicated to <slice-id=1, color=100>, such as te-tunnel3 dedicated to slice-1 described in this embodiment, that is, a BGP-LU route is iterated to the outer tunnel te-tunnel3 belonging to the corresponding slice according to the overlay service identification information. During the forwarding of the packet, the overlay service identification information is not popped from the packet.

At step 1108, the tunnel label of te-tunnel3 is terminated after the node PE2 receives the packet, and the packet hits the ILM entry according to the top label-pe2. Since the ILM entry hit by the packet includes the preset slice flag, the node PE2 knows that label-pe2 is immediately followed by the 32-bit overlay service identification information <slice-id=1, color=100> in the packet. Therefore, the node PE2 pops label-pe2 and the overlay service identification information according to the label operation of POP in the ILM entry hit by the packet, searches a table according to vpn-label1 and an IP payload of private network, and then forwards the packet to CE1-2. For forwarding the packet, it is possible to still use <slice-id=1, color=100> to determine a network resource (such as a queue) dedicated to CE1-2 at a client side in a private network.

For a packet forwarded from CE2-1 to CE2-2, the packet is processed on the nodes ASBR1, ASBR2, and PE2 in a way similar to the above implementation, and so the processing of the packet is not repeated here.

It should be noted that each te-tunnel in this embodiment may be replaced with an SR policy in other embodiments.

Exemplary Embodiment Five

In fact, as described above, an MPLS-TE LSP may be also upgraded to an MPLS-TE LSP with slice-capability.

Taking the conventional RSVP-TE protocol as an example, RFC3209 may be extended to newly define an RSVP slice-path message and a slice-reserve message, which are used in a very similar way to the existing RSVP path message and reserve message, except that the RSVP slice-path message and the slice-reserve message indicate that the created LSP is a slice LSP. An RSVP-TE LSP may be configured as a slice LSP on a head node of the RSVP-TE LSP. For this reason, the head node sends an RSVP slice-path message to a tail node along a TE path, and the tail node replies with an RSVP slice-reserve message along the TE path in the opposite direction, thereby creating an RSVP-TE slice LSP. The forwarding behaviors of the RSVP-TE slice LSP are similar to those of the MPLS-BE slice LSP described in the above embodiments, and when packet forwarding is performed along the RSVP-TE slice LSP, a label of RSVP-TE LSP is immediately followed by overlay service identification information in the packet. The detailed steps are not described here.

Taking an SR-TE tunnel (or SR policy) as an example, the SR-TE tunnel may be configured as a tunnel with slice-capability on a head node of the SR-TE tunnel. SR-TE does not have a protocol process similar to RSVP-TE, the forwarding information of SR-TE is generally a label stack composed of a plurality of labels corresponding to prefix-sid (or adjacency-sid). Like the above extension of ISIS, which newly defines the Slice-Prefix-SD Sub-TLV to replace the existing Prefix-SID Sub-TLV, a new Slice-Adj Sub-TLV/Slice-LAN-Adj-SID Sub-TLV may be similarly defined to replace the existing Adj-SID Sub-TLV/LAN-Adj-SID Sub-TLV, and thus the forwarding information of an SR-TE slice LSP becomes a label stack composed of a plurality of labels corresponding to slice prefix-sid (prefix-segment identifier) or slice-adjacency-sid (prefix-adjacency-segment identifier). When a packet is forwarded along the SR-TE slice LSP, a slice label corresponding to each layer of slice prefix-sid or slice adjacency-sid is immediately followed by overlay service identification information, each layer of slice label corresponds to one SR-BE slice LSP, and the forwarding behaviors of the SR-BE slice LSP are very similar to those of the MPLS-BE slice LSP described in the above embodiments.

For example, like the Exemplary Embodiment Two, supposing that an SR-TE tunnel with slice-capability is created from R1 to R3 over the network shown in FIG. 5, and has a SID (Segment Identifier) List of {Node-SID(for R2), Adjacency-SID(for R2-R3), Node-SID(for R3)}, with the Node-SIDS and the Adjacency-SID having the slicing capability. Such SID List may be translated into a label stack according to SRGB information, for example, the label stack is {label2(for R2), label23(for R2-R3), label3(for R3)}. The node R1 learns the VPN routes related to vpn-1, vpn-2 and vpn-3 from R3 using BGP. Supposing that VPN labels carried along with the advertisement of the routes are vpn-label1, vpn-label2 and vpn-label3 respectively, each of the VPN routes has a requirement of forwarding along a TE path (for example, the color of the VPN route related to vpn-1 is 100, the color of the VPN route related to vpn-2 is 200, and the color of the VPN route related to vpn-3 is 300), and all the routes are iterated to the above SR-TE tunnel according to a next hop (R3) of BGP and a corresponding tunnel policy. Since an entry in the SR-TE tunnel includes a preset slice flag, carrying overlay service identification information of a VPN service is supported in encapsulation of a packet, so that the overlay service identification information of the VPN service may be provided when the VPN route is iterated to an MPLS LSP of a public network, so as to map onto a specific underlay network resource. For example, for a packet to be forwarded from CE1-1 to CE1-2, an encapsulated label stack of the packet on the node R1 is as follows:

outer label: label2(for R2)
overlay service identification: slice-id=1, color=100
outer label: label23(for R2-R3)
overlay service identification: slice-id=1, color=100
outer label: label3(for R3)
overlay service identification: slice-id=1, color=100
inner label: vpn-label1

When forwarding the packet to the node R2, the node R1 uses an underlay network resource dedicated to <slice-id=1, color=100>, such as subport port1.sub-if-1 dedicated to slice-1 and a queue thereof described in this embodiment. At this time, a feasible queue scheduling solution may be to select a queue for the packet to enter from a local queue resource of subport port1.sub-if-1 by using the color as a queue scheduling factor. Or, other queue scheduling solutions may be adopted.

After being received by the node R2, the packet hits an ILM entry according to the top label2. Since the ILM entry hit by the packet includes a preset slice flag, the node R2 knows that label2 is immediately followed by 32-bit overlay service identification information <slice-id=1, color=100> in the packet. Therefore, the node R2 pops label2 and the overlay service identification information immediately after label2 according to a label operation of POP in the ILM entry hit by the packet. Then, the ILM entry is continuously hit according to label23. Similarly, since the ILM entry hit by the packet includes a preset slice flag, the node R2 knows that label23 is immediately followed by 32-bit overlay service identification information <slice-id=1, color=100> in the packet. Therefore, the node R2 removes label23 and the overlay service identification information immediately after label23 away according to a label operation of SWAP in the ILM entry hit by the packet (no label can be swapped at this time), and then forwards the packet to the node R3 using the underlay network resource dedicated to <slice-id=1, color=100>, such as subport port3.sub-if-1 and a queue thereof described in this embodiment. The encapsulated label stack of the packet is as follows:

outer label: label3(for R3)
overlay service identification: slice-id=1, color=100
inner label: vpn-label1

After being received by the node R3, the packet hits the ILM entry according to the top label3. Since the ILM entry hit by the packet includes a preset slice flag, the node R3 knows that label3 is immediately followed by 32-bit overlay service identification information <slice-id=1, color=100> in the packet. Therefore, the node R3 pops label3 and the overlay service identification information according to a label operation of POP in the ILM entry hit by the packet, searches a table according to vpn-label1 and an IP payload of private network, and then forwards the packet to CE1-2. For forwarding the packet, it is possible to still use <slice-id=1, color=100> to determine a network resource (such as a queue) dedicated to CE1-2 at a client side in a private network. It should be noted that the packet may be forwarded without using the underlay network resource corresponding to <slice-id=1, color=100>.

It should be noted that the overlay service identification may be carried only at the bottom of the label stack in another embodiment, that is, the encapsulated label stack of the packet is as follows:

outer label: label2(for R2)
outer label: label23 (for R2-R3)
outer label: label3 (for R3)
inner label: vpn-label1
overlay service identification: slice-id=1, color=100.

It is unnecessary for the label stack such encapsulated to carry a plurality of same overlay service identification.

Exemplary Embodiment Six

In fact, the solutions provided by the present disclosure may be also applied to an IPv6 forwarding plane, and draft-bashandy-isis-srv6-extensions-03, draft-ietf-6man-segment-routing-header-14 and draft-filsfils-spring-srv6-network-programming-05 describe how to apply the SR technology to the IPv6 forwarding plane, which is called SRv6 for short. In SRv6, a Segment Routing Header (SRH) is defined to encapsulate a Segment List, and main Segment types are still Node Segments and Adjacency Segments. A Segment List encapsulated in an SRH may be a list composed of 128-bit IPv6 addresses, or composed of 32-bit SID indexes, or even composed of 32-bit MPLS Labels. In any case, when a packet is forwarded segment by segment according to the Segment List, the packet needs to obtain a next segment from the SRH in each segment; if the obtained segment is a Node Segment, the Node Segment is converted into a corresponding IPv6 address, the IPv6 address is copied to a destination IP address field in an IPv6 header, and the packet is forwarded to a next Segment Node according to the shortest path; and if the obtained segment is an Adjacency Segment, a next Segment is continuously acquired from the SRH, and the packet is forwarded to a link corresponding to the Adjacency Segment.

Like the TE tunnel (or SR policy) of SR-MPLS, a TE tunnel (or an SRv6 policy) of SRv6 may be also configured to have the slicing capability. When a packet of a VPN service iterated to the SRv6 TE tunnel is forwarded, the corresponding overlay service identification information may be encapsulated in an SRH by adding a new sub-TLV, which is configured to store overlay service identification information, to the SRH. Based on the above, (1) in order to enable the shortest path forwarding of a Node Segment between two adjacent Segment Nodes (the nodes between which may not have the capability of SRv6) to support the slicing capability, a new Routing Extension Header, which includes overlay service identification information (copied from the overlay service identification information stored in the SRH), may be introduced to instruct the packet to be forwarded along the shortest path between the two adjacent Segment Nodes using a forwarding resource of a specific slice, and the Routing Extension Header may follow the IPv6 Header, or may be located in other positions; and (2) in order to enable the forwarding of an Adjacency Segment to support the slicing capability, a packet may be forwarded to a corresponding link using a forwarding resource of a specific slice according to the overlay service identification information stored in the SRH, and the specific forwarding process is not described in detail here. For the Adjacency Segment, the packet may also be forwarded to a corresponding link using a forwarding resource of a specific slice according to the overlay service identification information carried in the new Routing Extension Header.

It should be noted that only a Routing Extension Header carries overlay service identification information, while an SRH does not carry overlay service identification information in another embodiment.

Figure 12:
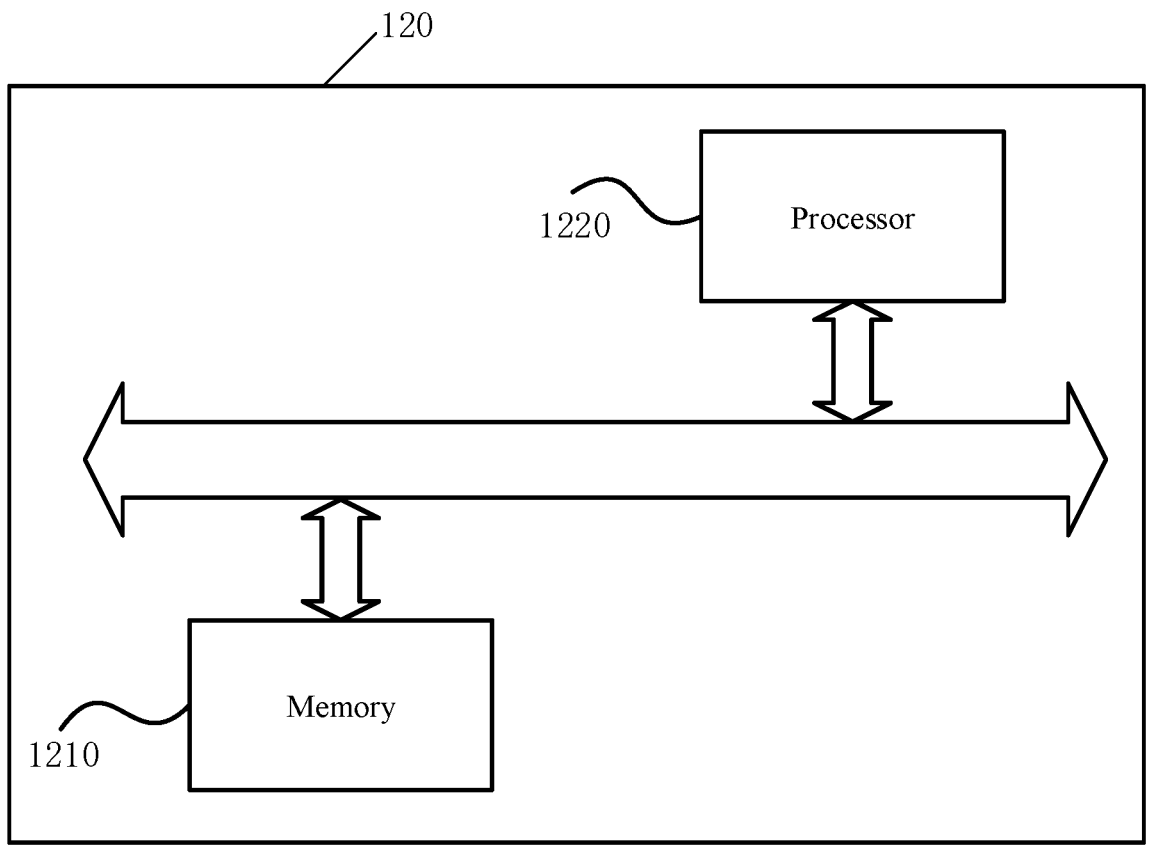
FIG. 12 is a block diagram of a node according to an embodiment of the present disclosure.

As shown in FIG. 12, an embodiment of the present disclosure provides a node 120, including a memory 1210 having a program stored therein, and a processor 1220. When the program is read and executed by the processor 1220, the transmission control method described in any one of the embodiments is implemented.

Figure 13:
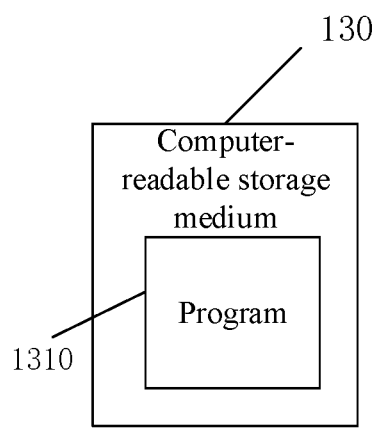
FIG. 13 is a block diagram of a storage medium according to an embodiment of the present disclosure.

As shown in FIG. 13, an embodiment of the present disclosure provides a computer-readable storage medium 130 having one or more programs 1310 stored therein, and the one or more programs 1310 can be executed by one or more processors to implement the transmission control method described in any one of the embodiments.

Figure 14:
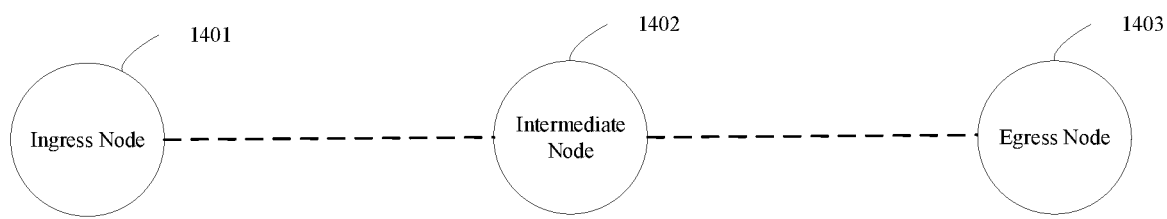
FIG. 14 is a diagram illustrating architecture of a network system according to an embodiment of the present disclosure.

As shown in FIG. 14, an embodiment of the present disclosure provides a network system, including an ingress node 1401, at least one intermediate node 1402, and an egress node 1403.

The ingress node 1401 is configured to encapsulate overlay service identification information corresponding to a packet in the packet, and transmit the packet to a next hop using an underlay network resource dedicated to a service corresponding to the overlay service identification information.

The intermediate node 1402 is configured to forward, when receiving a packet, the packet using an underlay network resource dedicated to a service corresponding to overlay service identification information carried in the packet.

The egress node 1403 is configured to forward, when receiving a packet, the packet using an underlay network resource dedicated to a service corresponding to overlay service identification information carried in the packet.

In one embodiment, a step of encapsulating, by the ingress node 1401, the overlay service identification information corresponding to the packet in the packet includes encapsulating the overlay service identification information in a label stack of the packet, with a position of the overlay service identification information in the label stack and a position of a slice label, which is included in an FTN entry hit by the packet, in the label stack satisfying a preset relationship.

In one embodiment, the intermediate node 1402 and the egress node 1403 are further configured to send a label binding advertisement carrying preset information to other node(s), and the preset information is configured to indicate that a current binding relationship is a binding relationship between a slice FEC and a slice label.

The intermediate node 1402 is further configured to create an ILM entry including a preset slice flag when receiving the label binding advertisement carrying the preset information.

The ingress node 1401 is further configured to create an FTN entry including a preset slice flag when receiving the label binding advertisement carrying the preset information.

It should be understood by those skilled in the art that the functional modules/units in all or some of the steps, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). The term "computer storage media" includes volatile/nonvolatile and removable/non-removable media used in any method or technology for storing information (such as computer-readable instructions, data structures, program modules and other data). The computer storage media include, but are not limited to, RAMs, ROMs, Electrically Erasable Programmable Read-Only Memories (EEPROMs), flash memories or other memory techniques, Compact Disc Read-Only Memories (CD-ROMs), Digital Video Disks (DVDs) or other optical discs, magnetic cassettes, magnetic tapes, magnetic disks or other magnetic storage devices, or any other media which can be used to store the desired information and can be accessed by a computer. In addition, the communication media generally include computer-readable instructions, data structures, program modules or other data in a modulated data signal, such as a carrier wave or other transmission mechanism, and may include any information delivery media.

INDUSTRIAL APPLICABILITY

As described above, the transmission control method, the node, the network system, and the storage medium according to the embodiments of the present disclosure can produce the following beneficial effects: when a node receives a packet, the node encapsulates overlay service identification information corresponding to the packet in the packet, and transmits the packet to a next hop using an underlay network resource dedicated to a service corresponding to the overlay service identification information, which obviates the need to maintain the complex IGP multitopology or multi-algorithm types for providing slices, thereby reducing the overheads.

What is claimed is:

1. A transmission control method, comprising:
   encapsulating, by a node, overlay service identification information corresponding to a packet in the packet, and transmitting, by the node, the packet to a next hop using an underlay network resource dedicated to a service corresponding to the overlay service identification information,
   wherein the step of encapsulating the overlay service identification information corresponding to the packet in the packet comprises:
   encapsulating a slice label and the overlay service identification information in a label stack of the packet according to a Forwarding equivalence class To Next hop label forwarding entry map (FTN) entry hit by the packet; wherein the slice label refers to a multiprotocol label switching (MPLS) label with slicing capability allocated to a slice forward equivalence class (FEC).

2. The transmission control method of claim 1, wherein the overlay service identification information comprises at least one of a slice identifier and traffic engineering constraint indication information.

3. The transmission control method of claim 1, wherein a position where the overlay service identification information is encapsulated in the label stack and a position where the slice label is encapsulated in the label stack satisfy a preset relationship,
   or,
   wherein a position where the overlay service identification information is encapsulated in the label stack and a position where the slice label is encapsulated in the label stack satisfy a preset relationship, and wherein the preset relationship satisfied by the position where the overlay service identification information is encapsulated in the label stack and the position where the slice label is encapsulated in the label stack comprises: the slice label is immediately followed by the overlay service identification information in the label stack.

4. The transmission control method of claim 1, wherein the step of encapsulating the slice label and the overlay service identification information in the label stack of the packet according to the FTN entry hit by the packet comprises:
   encapsulating the slice label and the overlay service identification information in the label stack of the packet according to the FTN entry hit by the packet when the FTN entry hit by the packet comprises a preset slice flag.

5. The transmission control method of claim 4, further comprising creating, by the node, the FTN entry comprising the preset slice flag when the node receives a label binding advertisement carrying preset information.

6. The transmission control method of claim 5, wherein the carried preset information comprises that a TYPE field in label type length value information in the label binding advertisement is a preset value,
   or,
   wherein the label binding advertisement further comprises encapsulation mode information of overlay service identification information, and the FTN entry comprising the preset slice flag further comprises the encapsulation mode information of overlay service identification information; and
   the step of encapsulating the overlay service identification information comprises:
   encapsulating the overlay service identification information in the label stack of the packet according to the encapsulation mode information of overlay service identification information in the FTN entry hit by the packet.

7. The transmission control method of claim 1, wherein the step of encapsulating the overlay service identification information corresponding to the packet in the packet comprises at least one of:
   encapsulating the overlay service identification information corresponding to the packet in a segment routing header of the packet; or
   carrying the overlay service identification information corresponding to the packet in a routing extension header newly defined in the packet.

8. A transmission control method, comprising:
   when a node receives a packet, forwarding, by the node, the packet using an underlay network resource dedicated to a service corresponding to overlay service identification information carried in the packet,
   wherein the overlay service identification information is carried in a label stack of the packet, and a position of the overlay service identification information in the label stack and a position of a slice label, which is in an incoming label map (ILM) entry hit by the packet, in the label stack satisfy a preset relationship,
   wherein the slice label refers to a multiprotocol label switching (MPLS) label with slicing capability allocated to a slice forward equivalence class (FEC).

9. The transmission control method of claim 8,
   before the step of forwarding the packet using the underlay network resource dedicated to the service corresponding to the overlay service identification information carried in the packet, the method further comprises performing label swapping by the node according to an ILM entry hit by the packet, with the overlay service identification information in the label stack reserved during the label swapping.

10. The transmission control method of claim 8, wherein the step of forwarding the packet using the underlay network resource dedicated to the service corresponding to the overlay service identification information carried in the packet comprises:
    forwarding the packet using the underlay network resource dedicated to the service corresponding to the overlay service identification information carried in the packet when an ILM entry hit by the packet comprises a preset slice flag.

11. The transmission control method of claim 10, further comprising, when the node receives a label binding advertisement carrying preset information, creating the ILM entry comprising the preset slice flag by the node,
    or,
    the method further comprising, when the node receives a label binding advertisement carrying preset information, creating the ILM entry comprising the preset slice flag by the node, wherein the carried preset information is that a TYPE field in label type length value information in the label binding advertisement is a preset value.

12. The transmission control method of claim 8, before the step of forwarding the packet using the underlay network resource dedicated to the service corresponding to the overlay service identification information carried in the packet, further comprising popping a slice label from a label stack of the packet and popping the overlay service identification information according to an ILM entry hit by the packet.

13. The transmission control method of claim 12, wherein the step of popping the overlay service identification information comprises:
    popping the overlay service identification information from the label stack when the ILM entry hit by the packet comprises a preset slice flag,
    or,
    the method further comprises that the node configures a forward equivalence class (FEC), allocates a slice label to the FEC, and creates an ILM entry, which comprises a preset slice flag, for the FEC.

14. The transmission control method of claim 8, further comprising sending, by the node, a label binding advertisement carrying preset information to another node, the preset information being configured to indicate that a current binding relationship is a binding relationship between an FEC and a slice label,
    or,
    the method further comprising sending, by the node, a label binding advertisement carrying preset information to another node, the preset information being configured to indicate that a current binding relationship is a binding relationship between an FEC and a slice label, wherein the label binding advertisement sent by the node further comprises encapsulation mode information of overlay service identification information.

15. A node, comprising a memory having a program stored therein, and a processor, wherein when the program is read and executed by the processor, the transmission control method of claim 1 is implemented.

16. A computer-readable storage medium having one or more programs stored therein, wherein the one or more programs are executable by one or more processors to implement the transmission control method of claim 1.

17. A network system, comprising an ingress node, at least one intermediate node, and an egress node, wherein:
    the ingress node is configured to encapsulate overlay service identification information corresponding to a packet in the packet, and transmit the packet to a next hop using an underlay network resource dedicated to a service corresponding to the overlay service identification information;
    the intermediate node is configured to forward, when receiving a packet, the packet using an underlay network resource dedicated to a service corresponding to overlay service identification information carried in the packet; and
    the egress node is configured to forward, when receiving a packet, the packet using an underlay network resource dedicated to a service corresponding to overlay service identification information carried in the packet,
    wherein the encapsulating, by the ingress node, the overlay service identification information corresponding to the packet in the packet comprises: encapsulating the overlay service identification information in a label stack of the packet, with a position of the overlay service identification information in the label stack and a position of a slice label, which is in an FTN entry hit by the packet, in the label stack satisfying a preset relationship, wherein the slice label refers to a multi-protocol label switching (MPLS) label with slicing capability allocated to a slice forward equivalence class (FEC).

18. The network system of claim 17, wherein
the intermediate node and the egress node are further configured to send a label binding advertisement carrying preset information to another node, the preset information being configured to indicate that a current binding relationship is a binding relationship between a slice FEC and a slice label;
the intermediate node is further configured to create an ILM entry comprising a preset slice flag when receiving the label binding advertisement carrying the preset information; and
the ingress node is further configured to create an FTN entry comprising a preset slice flag when receiving the label binding advertisement carrying the preset information.

* * * * *